US008393150B2

(12) United States Patent
Brickner et al.

(10) Patent No.: US 8,393,150 B2
(45) Date of Patent: Mar. 12, 2013

(54) SYSTEM AND METHOD FOR OPERATING A VARIABLE DISPLACEMENT HYDRAULIC PUMP

(75) Inventors: Chad T. Brickner, Aurora, IL (US); Jason L. Brinkman, Peoria, IL (US); Randall T. Anderson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1118 days.

(21) Appl. No.: 12/338,801

(22) Filed: Dec. 18, 2008

(65) Prior Publication Data

US 2010/0154403 A1 Jun. 24, 2010

(51) Int. Cl.
*F16D 31/02* (2006.01)

(52) U.S. Cl. .......................................... 60/452; 60/443

(58) Field of Classification Search .................... 60/443, 60/445, 452, 465
See application file for complete search history.

(56) References Cited

U.S. PATENT DOCUMENTS 3,750,762 A 8/1973 Eaton
3,886,742 A 6/1975 Johnson
3,996,743 A 12/1976 Habiger et al.
4,182,125 A 1/1980 Spivey, Jr.
4,475,380 A 10/1984 Colovas et al.
4,630,685 A 12/1986 Huck, Jr. et al.
4,976,331 A 12/1990 Noerens
5,065,319 A 11/1991 Iwatsuki et al.
5,077,973 A 1/1992 Suzuki et al.
5,468,126 A 11/1995 Lukich
5,469,646 A 11/1995 Takamura
5,720,358 A 2/1998 Christensen et al.
5,951,258 A 9/1999 Lueschow et al.
5,954,617 A 9/1999 Horgan et al.
5,983,156 A 11/1999 Andrews
6,042,505 A 3/2000 Bellinger
6,083,541 A 7/2000 Hamstra et al.
6,109,030 A * 8/2000 Geringer ........................ 60/452
6,186,198 B1 2/2001 Holmes
6,385,970 B1 5/2002 Kuras et al.
6,387,011 B1 5/2002 Bellinger
6,436,005 B1 8/2002 Bellinger
6,496,767 B1 12/2002 Lorentz
6,546,329 B2 4/2003 Bellinger
6,819,996 B2 11/2004 Graves et al.
6,944,532 B2 9/2005 Bellinger
7,146,263 B2 12/2006 Guven et al.
2002/0132699 A1 9/2002 Bellinger
2002/0184881 A1 12/2002 Oka
2003/0225500 A1 12/2003 Bergqvist et al.
2004/0002806 A1 1/2004 Bellinger
2004/0088103 A1 5/2004 Itow et al.
2004/0128047 A1 7/2004 Graves et al.
2004/0148084 A1 7/2004 Minami
2005/0288148 A1 12/2005 Kuras et al.
2007/0010927 A1 1/2007 Rowley et al.
2007/0283688 A1 * 12/2007 Vigholm et al. ................ 60/421
2010/0161186 A1 6/2010 Quinn et al.

FOREIGN PATENT DOCUMENTS

WO 82/00617 A1 3/1982

* cited by examiner

*Primary Examiner* — Michael Leslie
(74) *Attorney, Agent, or Firm* — Leydig, Voit & Mayer

(57) ABSTRACT

A control for a variable displacement pump disposed in a hydraulic system obtains a requested signal from a manual control device and provides a command signal to a valve operating to adjust a displacement setting of the variable displacement pump. The control provides the command signal based on the requested signal, and scales the requested signal based on a sensed or calculated load of the system.

17 Claims, 8 Drawing Sheets

SYSTEM AND METHOD FOR OPERATING A VARIABLE DISPLACEMENT HYDRAULIC PUMP

TECHNICAL FIELD

This patent disclosure relates generally to hydraulic systems and, more particularly to systems and methods of derating the hydraulic system of a machine based on at least one machine operating parameter.

BACKGROUND

Various applications use hydraulic systems to operate systems and implements associated with machines. Such applications often include machines such as, for example, wheel loaders, track type tractors, and other types of heavy machinery, that are used for a variety of tasks. These machines include a power source, such as a diesel engine, gasoline engine, or natural gas engine that provides the power required to complete machine tasks, such as loading or bulldozing.

During operation, the load on the hydraulic system of such machines often changes depending on environmental factors. Such factors include grades that the machine must climb or descend, boulders or other objects that the implement or blade of the machine encounters when moving earth, and so forth. These increases and decreases in load demand may occur gradually or may be applied instantaneously. Regardless of the application of load to the hydraulic system of the machine, changes in the load of the system may disrupt the smooth operation of the machine.

To address changes in the loading of the hydraulic system of a machine, the power rating of the hydraulic system may be modulated. For example, a bulldozer pushing earth, or a loader intermittently lifting a full bucket, may advantageously de-rate its hydraulic system to consume less power and to permit a greater power reserve to be available, if needed, during operation.

SUMMARY

The disclosure describes, in one aspect, a machine including an engine and a hydraulic system having a reservoir connected to a drain passage. The hydraulic system includes an implement valve that operates an implement. The implement valve provides at a reference pressure within a control conduit during operation. The machine further includes a manual control device adapted to provide a command signal and a variable displacement pump operably connected to the engine. The variable displacement pump receives a torque limit from the engine, is associated with the hydraulic system, and provides an operating fluid flow at a supply pressure to the hydraulic system. The operating fluid flow being is correlated to a load during operation. A control valve that is fluidly connected to the control conduit operates to adjust a displacement setting of the variable displacement pump based on a pressure difference between the reference pressure and the supply pressure. In one embodiment, an electro-hydraulic (EH) relief valve is in fluid communication with the control conduit and the drain passage. The EH valve selectively vents fluid from the control conduit into the drain passage in response to a control signal. An electronic controller associated with the control valve, the electro-hydraulic relief valve, and the engine, receives at least one signal that is indicative of at least one machine operating parameter and calculates a command pressure. The electronic controller provides the control signal to the EH valve based on the command pressure.

In another aspect, the disclosure describes a machine including an engine and a hydraulic system having a reservoir connected to a drain passage. In this embodiment, an electronic pressure reducing valve (EPRV) fluidly communicates with the control conduit, the supply conduit, and the drain passage. The EPRV selectively vents fluid from the supply conduit into a reduced pressure conduit in response to a control signal. A low pressure resolver has a first inlet in fluid communication with the reduced pressure conduit, a second inlet in fluid communication with the control conduit, and an outlet in fluid communication with the control valve. The low pressure resolver fluidly connects the outlet thereof with the first or second inlet depending on their respective pressure. An electronic controller receives at least one signal that is indicative of at least one machine operating parameter, calculates a command pressure, and provides the control signal to the EPRV based on the command pressure In yet another aspect, the disclosure provides a method for de-rating a hydraulic system operating in a machine by limiting a flow of fluid through a main valve. The method includes determining a loading of the hydraulic system, providing a scale factor for de-rating the hydraulic system based on the loading, and applying the scale factor to a command signal to generate an adjusted valve flow signal. A load consumption of the hydraulic system is reduced by operating the main valve in response to the adjusted valve flow signal.

DETAILED DESCRIPTION

This disclosure relates to hydraulic systems that use a variable displacement pump. An exemplary deployment of the disclosure is in a hydrostatically driven machine having hydraulically operated implements associated therewith. In the embodiment described below, a tracked loader is disclosed but it can be appreciated that other types of machines can benefit from the embodiments disclosed herein. In the present embodiment, an electronic controller associated with the machine is operably connected to various components and systems of the machine, and arranged to send and receive information relative to the operation of the machine. Various sensors located throughout the machine are arranged to provide information to the electronic controller concerning the operating state of the machine. For example, various pressure sensors may be arranged to provide information about the various pressures in the drive or implement circuits of the vehicle. Other sensors, such as one or more speed sensor(s) associated with either the engine or a transmission that send (s) values indicative of the rotational speed of these components (and/or of the ground speed) may be connected to the electronic controller.

In the illustrated embodiment, the electronic controller communicates either directly or indirectly with the engine of the machine, such that an underspeed set point may be obtained and used during service. These functions of the machine may advantageously be carried out automatically and independent of any selections that may be required by the operator. In this fashion, the vehicle may operate with improved overall machine productivity and power utilization, thus decreasing fuel consumption and cost of ownership for the operator.

Figure 1:
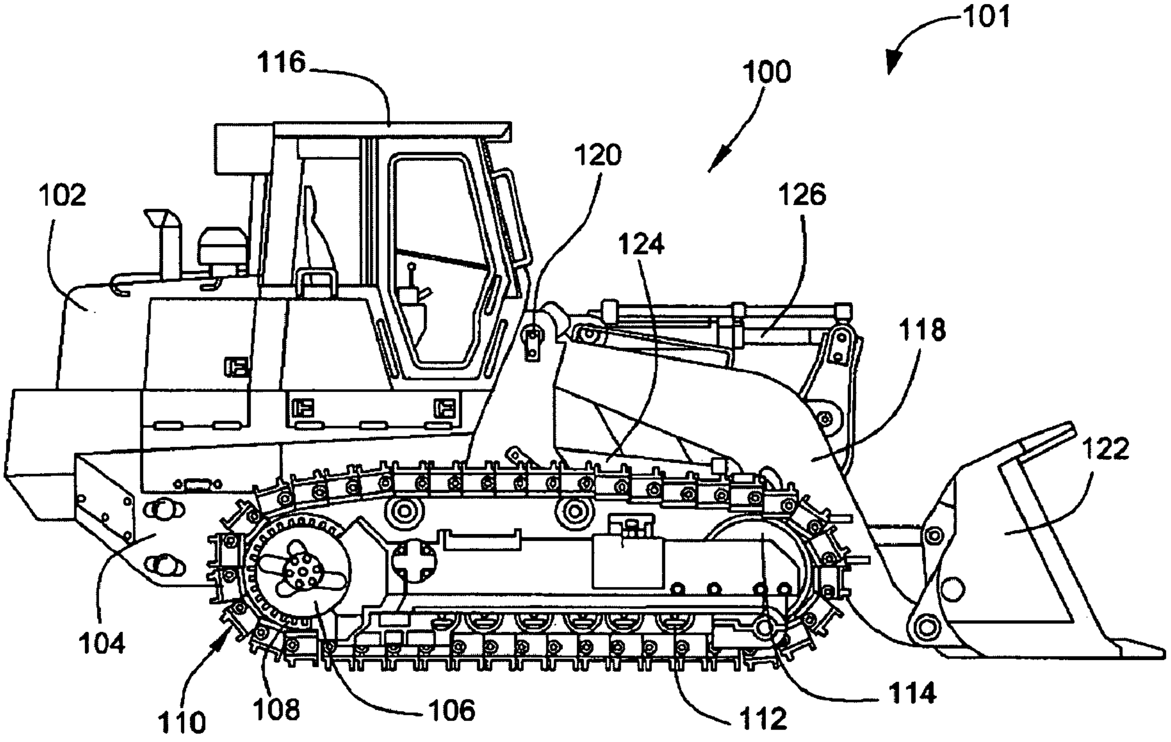
FIG. 1 is a side view of a machine in accordance with the disclosure.

An outline view of a machine 100 is shown in FIG. 1. The term "machine" is used generically to describe any machine having a hydraulically operated implement circuit operating an implement for performing various machine tasks. The machine 100 is a tracked loader 101 used for the sake of illustration.

The tracked loader 101 includes an engine 102 connected to a frame or chassis 104. The engine 102 operates one or more hydrostatic pumps (not shown) that are configured to operate one or more propel motors 106. Each of the one or more propel motors 106 drives a gear 108, which is meshed with a track 110. When the gear 108 rotates, the track 110 is urged to rotate and propel the vehicle along. In this type of tracked machine, the track 110 rotates around a series of pulleys 112 and a free rotating drum 114, which align the track 110 with the chassis 104. As can be appreciated, the tracked loader 101 may be propelled either forward or in a reverse direction depending on the rotation of the gear 108.

An operator cab 116 containing various controls for the tracked loader 101 is connected to the chassis 104. The operator cab 116 includes a seat for the operator and a series of control levels, pedals or other devices that control the various functions of the tracked loader 101. Lift arms 118 (only one seen in this view) are connected to the frame of the machine 100 at a hinge 120. The lift arms 118 can pivot about the hinge 120 so that a bucket 122, or any other implement, may be raised or lowered by the tracked loader 101. The pivotal motion of the lift arms 118 is controlled by lift cylinders 124. In this embodiment, the bucket 122 may be tilted by tilt cylinders 126 via a linkage system. The lift cylinders 124, the tilt cylinders 126, the gear 108, and other actuators and/or motors on the tracked loader 101 may be operated by hydraulic systems or systems selectively providing pressurized fluid to these actuators during operation.

Figure 2:
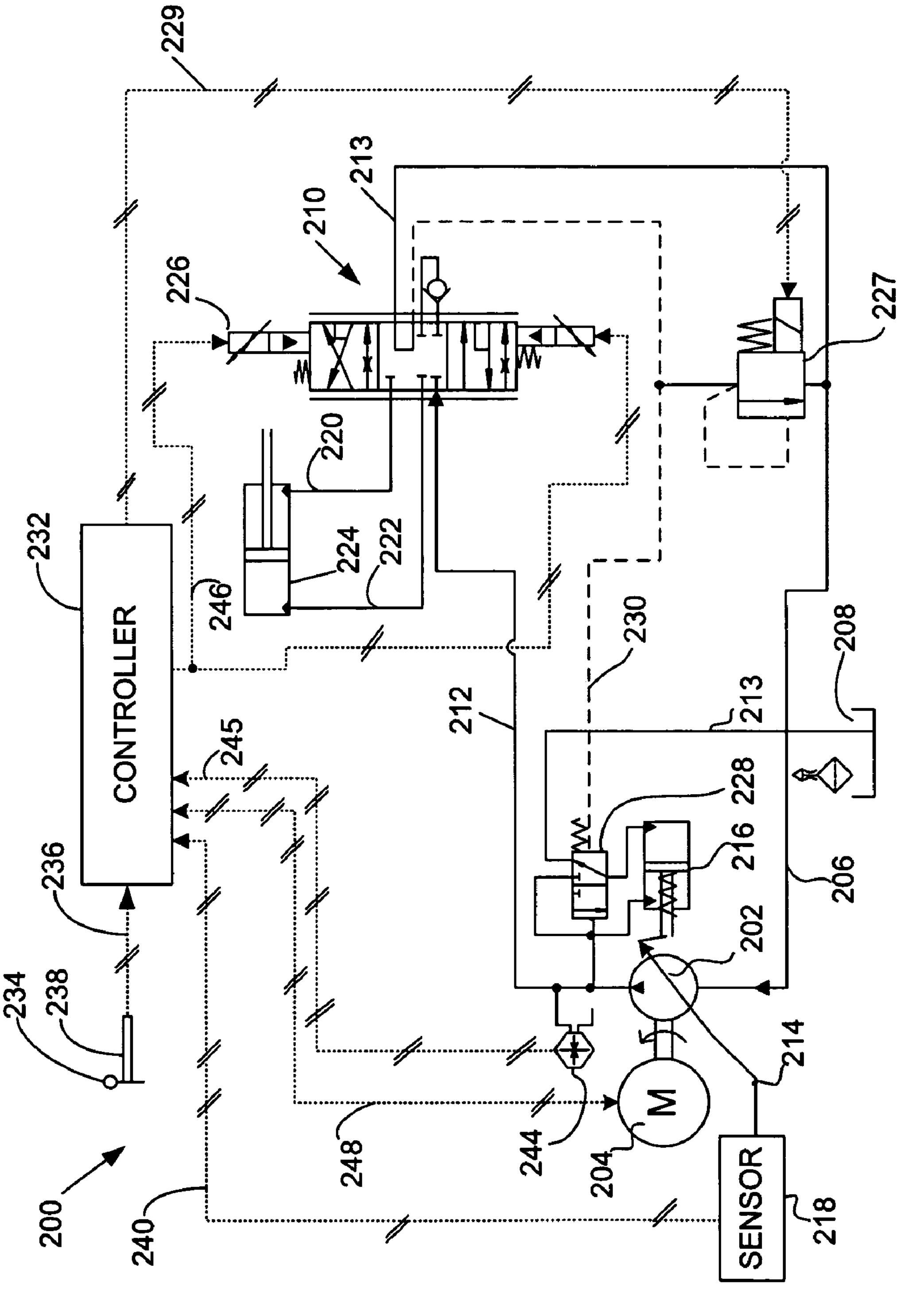
FIG. 2 is a block diagram of a hydraulic system in accordance with the disclosure.

A simplified circuit diagram for a hydraulic system 200 is shown in FIG. 2. The hydraulic system 200 includes a portion of the circuit operating the implement of the tracked loader 101 shown in FIG. 1. As can be appreciated, hydraulic components and connections that are associated with a drive system of the tracked loader 101 may operate based on principles similar to the principles and designs discussed herein. Thus, the simplified hydraulic system shown and described is presented for the sake of illustration and should not be construed as limiting to the scope of the disclosure.

The hydraulic system 200 includes a pump 202, which is a variable displacement pump. The pump 202 is connected to a prime mover, in this case, the engine 204 of the machine. In an alternate embodiment, the pump 202 may be connected to another type of prime mover, for example, an electric motor. The pump 202 has an inlet conduit 206 connected to a vented reservoir or drain 208. When the engine 204 is operating, the pump 202 draws a flow of fluid from the drain 208 and provides a pressurized flow of fluid to an infinite position seven-port two-way (7-2) valve 210 via a supply line or supply conduit 212. A drain port of the valve 210 is connected via a drain passage 213 to the drain 208. A control lever 214 is connected to a swashplate (not shown) internal to the pump 202 that is arranged to change the displacement of the pump 202. Motion of the control lever 214, in one embodiment, is accomplished by a hydraulic pump control actuator 216.

The hydraulic pump control actuator 216 in this embodiment is a two-way piston having a spring return. One side of the piston is connected to the outlet of the pump 202 along the supply conduit 212. The other side of the piston is selectively connected either to the supply conduit 212 or the drain 208 via a pump control valve 228. In one embodiment, the pump control valve 228 is a three-port-two-way (3-2) valve that can move in response to a pressure difference between the reference pressure 230 and the supply pressure of fluid within the supply conduit 212. The reference pressure 230 is supplied on one side of a sliding member of the pump control valve 228 and acts against a spring and against the supply pressure in the supply conduit 212 such that the second side of the hydraulic pump control actuator 216 moves to decrease the displacement of the pump 202 as the pertinent system pressures change.

The reference pressure 230, which can also be referred to as a load indicating or load sensing pressure, is supplied from an appropriate port of the 7-2 valve 210. In this embodiment, the reference pressure 230 is further regulated by the operation of an electro-hydraulic (EH) valve 227. In one embodiment, the EH valve 227 includes a variable orifice valve member connected to and arranged to move by action of an electronic solenoid or other electrical actuator. The valve member of the EH valve 227 is connected between a passage that communicates the reference pressure 230 and the drain passage 213. Selective activation of the EH valve 227 operates to relieve or vent fluid such that the reference pressure 230 may be selectively reduced. Operation of the EH valve 227 is made in response to an electrical signal from an electronic controller 232 that is operatively associated therewith.

The EH valve 227 is connected to an electronic controller 232 and arranged to receive a command signal therefrom via a command line 229. The EH valve 227 is, therefore, arranged to adjust the reference pressure 230 based on the command signal present at the command line 229. The pump control valve 228 is supplied with a fraction of the pressure present at the supply conduit 212, which fraction depends on the position of the pump control valve 228, which in turn depends on the reference pressure 230. In this fashion, the EH valve 227 can modulate the displacement of the pump 202 by selectively reducing the displacement of the pump 202 when the reference pressure 230 is adjusted based on the command signal supplied via the command line 229.

The electronic controller 232 receives information from various sensors on the machine. Such information is processed to allow the electronic controller 232 to issue appropriate commands to various actuators within the system during operation. Connections pertinent to the present description are shown but, as can be appreciated, other connections relative to the electronic controller 232 may also be present. Alternatively, or in addition, analogous connections may be employed to obtain analogous information and to provide analogous control signals. In this embodiment, the electronic controller 232 is connected to a control input 234 via a control signal line 236. The control input 234, shown schematically, may be a lever moveable by the operator of the vehicle to set a desired speed, direction of motion, or position setting of an implement cylinder. The position of the control input 234 is translated to a command signal through a sensor 238 associated with the control input 234. The electronic controller 232 processes this control signal along with other parameters, for example, the speed of the engine 204, the temperature of fluid within the reservoir or drain 208, and so forth, to determine a desired angle or relative position of the swashplate that causes a desired motion or position of a work implement of the machine to be attained. In an alternate embodiment, the machine may include a hydrostatically operated propel system. In such a machine, the speed and direction of the machine may also be controlled electronically.

The sensor 218 is appropriately connected to the electronic controller 232 via a pump setting feedback line 240 and arranged to provide a position signal or other signal indicative of the position, setting, or angle of the swashplate within the pump 202. The electronic controller 232 also issues commands operating the various actuators in the hydraulic system 200. For example, a multi-channel engine communication line 248 provides the electronic controller 232 with information indicative of various engine parameters, such as engine speed and load, and also provides commands and settings to various engine actuators and systems. Further, the electronic controller 232 is connected to a pressure sensor 244 via a pressure signal line 245. The pressure sensor 244 detects a pressure of fluid in the supply conduit 212 and provide a pressure signal that is indicative of such fluid pressure to the electronic controller 232 via the pressure signal line 245.

In one embodiment, the electronic controller 232 controls the displacement of the pump 202. When a change in displacement occurs, a command from the control input 234 is provided to the electronic controller 232 via the control signal line 236. The electronic controller 232 processes such command and provides an appropriate command via the signal lines 246 causing a displacement of the main valve 210. Such displacement of the main valve 210 causes an appropriate flow of hydraulic fluid through one of the first and second conduits 220 or 222. Simultaneously, the displacement of the main valve 210 causes a change in fluid pressure present in the control conduit providing the reference pressure 230 to the valve 228 controlling the displacement of the pump 202. The change in the reference pressure 230 changes the pressure balance between the reference pressure 230 and the pump supply pressure 212, which in turn causes a change in the position of the control valve 228. Such adjustment of the control valve 228 can cause a change in the displacement of the pump 202. At times, the controller 232 may additionally adjust the signal present at the command line 229. The signal at the command line 229 commands the EH valve 227 to appropriately change the reference pressure 230, which in turn causes movement of the pump control valve 228. Motion of the pump control valve 228 changes the pressure balance of fluid within the hydraulic pump control actuator 216, thus changing the displacement of the pump 202.

The displacement or angle of the control lever 214, which in the illustrated embodiment is equivalent to the angle of the swashplate of the pump 202, may be sensed or measured by the sensor 218. The sensor 218 may be, for example, an analog or digital sensor measuring the angle (or, equivalently, the displacement) of the control lever 214 and, hence, the position of the swashplate within the pump 202. The pump 202 propels a flow of fluid through the supply conduit 212 when the engine 204 operates. Depending on the position of the 7-2 valve 210, fluid from the supply conduit 212 is routed into one of two conduits, a first conduit 220 and a second conduit 222, which are respectively connected to either side of a hydraulic piston or actuator 224. The position of the 7-2 valve 210 is controlled by a valve actuator 226, disposed to reciprocally move the 7-2 valve 210 between two positions to move the actuator 224 in the desired direction. In the embodiment shown, the valve actuator 226 includes two solenoid actuators, each disposed to move the 7-2 valve 210 in one direction.

Figure 3:
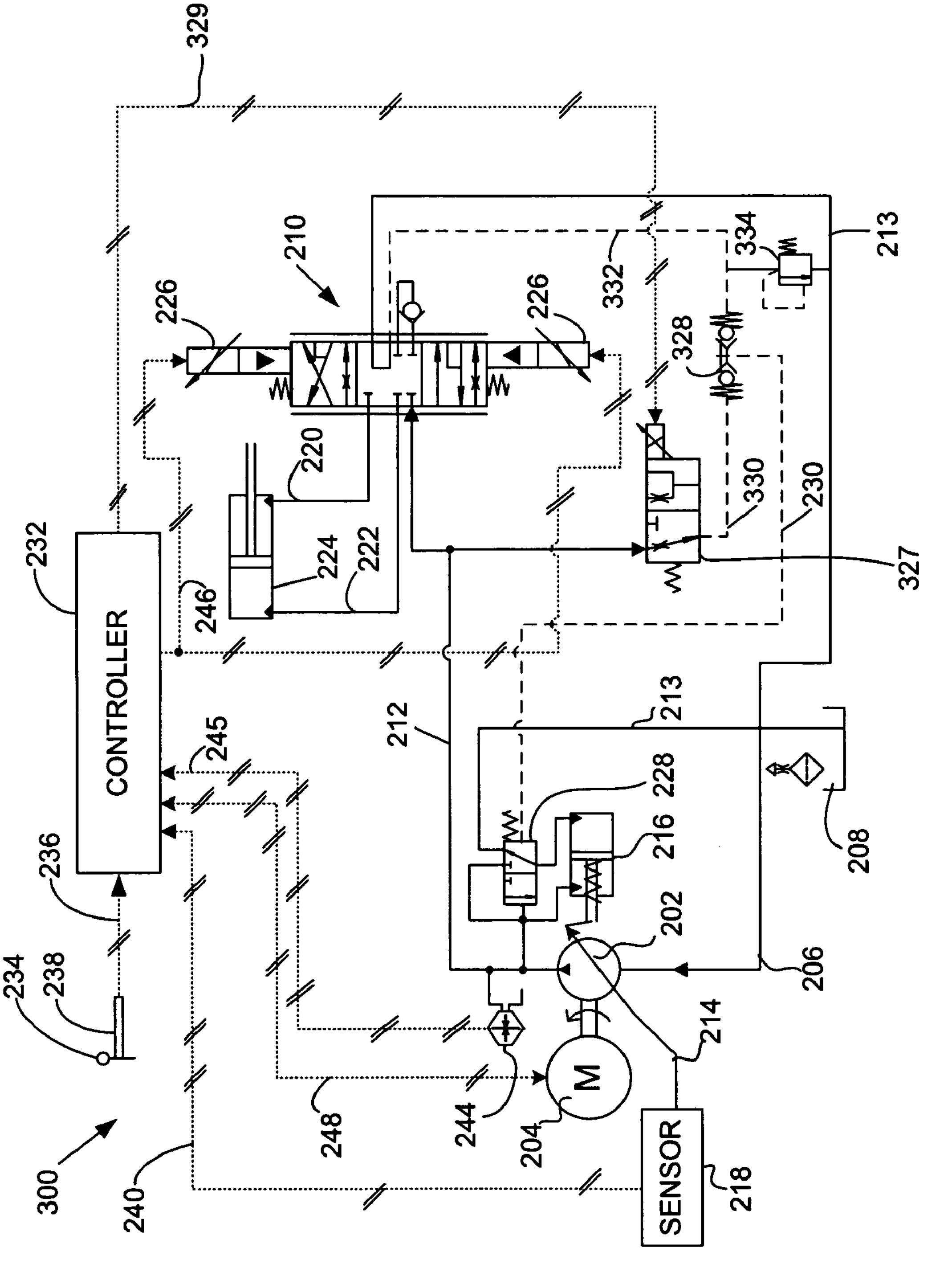
FIG. 3 is a block diagram of an alternate embodiment of a hydraulic system in accordance with the disclosure.

An alternative embodiment of a hydraulic system 300 is shown in FIG. 3. In the description that follows, elements having the same or similar functional or physical characteristics as previously described are denoted by the same reference numerals for simplicity. The hydraulic system 300 is similar to the hydraulic system 200 shown in FIG. 2, except for the devices that can control and adjust the reference pressure 230. In this embodiment, the EH valve 227 (FIG. 2) is replaced by an electronic pressure reducing valve (EPRV) 327. The EPRV 327 is combined with a low pressure resolver 328, which is a check valve arrangement having two inlet ports and a single outlet port. The low pressure resolver 328 fluidly connects the inlet port disposed at the lowest pressure with the outlet port.

In one embodiment, the EPRV 327 includes one or more flow orifices that can reduce the pressure of an incoming flow. In the embodiment shown, the EPRV 327 is an electronically controlled two-position valve that provides a reduced pressure at an outlet 330, that is, a fraction of the supply pressure of the pump 202. The reduced pressure at the outlet 330 is provided to one input of the low pressure resolver 328. A load sensing pressure 332 from the 7-2 valve 210 is provided to the other input of the low pressure resolver 328, such that the lowest of the reduced pressure 330 and the load sensing pressure 332 is provided as the reference pressure 230 at the outlet of the low pressure resolver 328. The load sensing pressure 332 can be limited by a spring-loaded or automatic relief valve 334 that is connected to the drain passage 213. Operation of the EPRV 327 is controlled by a command signal provided by the electronic controller 232 to an actuator of the EPRV 327 via a command line 329.

The electronic controller 232 calculates an appropriate torque limit that is expressed in terms of an adjusted reference pressure 230. The adjusted reference pressure 230 changes the displacement of the pump 202 such that the limited torque will be applied to the prime mover connected thereto. Thus, the electronic controller 232 calculates a reference pressure 230 that is desired to achieve the appropriate displacement setting of the pump. This is accomplished by providing an appropriate command to a valve that can modify or adjust the pressure of fluid present in the reference pressure 230 conduit during operation. Fluid at the reference pressure 230 can be vented or otherwise removed from a hydraulic line that contains the reference pressure 230 to adjust the displacement of the pump. In one embodiment, the relief valve flow is represented by the amount of fluid that is vented when the EH valve 227 (FIG. 2) or the EPRV 327 (FIG. 3) are operated.

When controlling the various devices of the system, physical relationships and function aspects may be determined by use of physical expressions or equations. For example, when determining a reference pressure for the EH valve 227 or the EPRV 327, the following expressions may be used:

$$P_{ref} = P_p - P_{margin} + \frac{K_p e - D_p \dot{P}_p}{K_m P_p} + K_i \int e\,dt$$

$$\text{where:} e = T_{limit} - D_p P_p$$

In the above relationships, $P_{ref}$ is the desired reference pressure 230, $P_p$ is the pressure at the outlet of the pump, $P_{margin}$ is an equivalent pressure on the valve 228 (FIG. 2 and FIG. 3) due to the spring return, $D_p$ is the displacement of the pump, $K_p$ is a proportional gain, $K_m$ is a gain relating to the control valve 228, $K_i$ is an integral gain, and e is an error term defined as a difference between a torque limit, $T_{limit}$, and the product between pump displacement and pump pressure.

Figure 4:
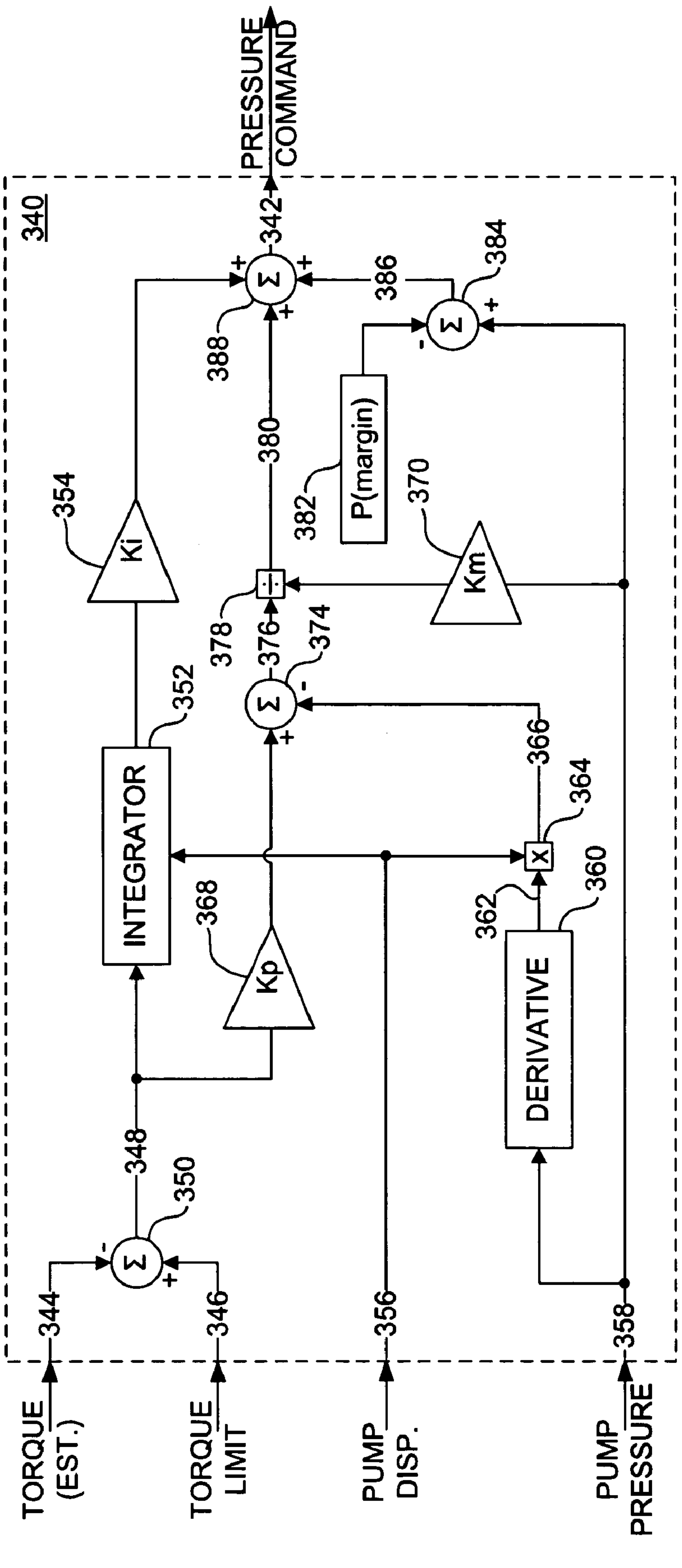
FIG. 4 is a block diagram illustration of an electronic controller in accordance with the disclosure.

A block diagram for one embodiment of an electronic controller 340 is shown in FIG. 4. The electronic controller 340 can be any electronic device that is capable of executing a computational algorithm or the like to manipulate signals and provide command signals to various actuators and other components of the machine. The electronic controller 340 is disposed to receive various signals that are indicative of relevant operating parameters of the machine, appropriately process such input signals, and provide a pressure command signal 342. In one embodiment, the pressure command signal 342 is an electrical signal provided to a valve or any other device that operates to adjust the reference pressure 230 either directly, as does the EH valve 227 (FIG. 2), or indirectly, as does the EPRV 327 (FIG. 3). For example, in the embodiments illustrated in FIG. 2 and FIG. 3, the pressure command signal 342 is the command signal provided by the electronic controller 232 on, respectively, the command line 229 (FIG. 2) or the command line 329 (FIG. 3).

The electronic controller 340 is arranged to manage the torque or power used in a hydraulic system. In one embodiment, the input signals provided to the electronic controller 340 include signals that relate to the operation of a pump associated with the hydraulic system. In the embodiment illustrated in FIG. 4, the electronic controller 340 receives an estimated torque signal 344 and a torque limit 346. In one embodiment, the estimated torque signal 344 is an estimation provided by a different control algorithm (not shown) that monitors the operation of the pump 202 (FIG. 2 and FIG. 3) and provides an estimation for the torque being consumed by the pump 202 during operation. The estimated torque signal 344 may be measured directly by an appropriate sensor of the machine, or may alternatively be calculated in the same or another electronic controller (not shown) that is associated with the engine or any other prime mover of the machine. For example, the torque output of an internal combustion engine may be estimated based on the fuel consumption of the engine, while the torque output of an electric motor used to drive a hydraulic pump may be estimated based on the current and voltage values used to operate the motor. The torque consumption of a component, for example, a pump or A/C compressor, may be estimated based on one or more operating parameters of such component. In the embodiment presented, the estimated torque signal 344 may be based on the result of a multiplication between the displacement and pressure of the hydraulic pump.

The torque limit 346 that is provided to the electronic controller 340 may be a constant or variable parameter. The torque limit 346 may be provided by a different electronic controller (not shown) or may alternatively be determined by a separate algorithm operating in another portion (not shown) of the electronic controller 340. In one embodiment, the torque limit 346 represents the maximum torque that can be supplied to operate the hydraulic system by the prime mover. In such embodiment, for example, the torque limit may represent the power capability of an internal combustion engine operating in a transient condition. In an alternate embodiment, the torque limit 346 may represent a constant value that is indicative of the physical operating limitations of various components of the machine.

In the illustration of FIG. 4, the electronic controller 340 calculates a difference or error value 348 between the estimated torque signal 344 and the torque limit 346 in a summation block 350. The error value 348 is negative when the estimated torque signal 344 exceeds the torque limit 346. The error value 348 is provided to an integrator 352 that can aggregate or incrementally advance an output value or integral term over time based on the error value 348. The integrator 352 can be any appropriate computational integration algorithm that essentially determines an integral of an input value over time. The output of the integrator 352 is multiplied by an integral gain, Ki, which is denoted by reference numeral 354 and which may be a constant or variable value. The integral gain 354 can be selected to compensate for effects of the spring and other effects onto the control valve 228 (FIG. 2 and FIG. 3) during operation.

The electronic controller 340 is further disposed to receive a pump pressure signal 358. The pump pressure signal 358 is indicative of the pressure of fluid at the outlet of the hydraulic pump. For example, the pump pressure signal 358 may be the signal provided to the electronic controller 232 via the pressure signal line 245 by the pressure sensor 244 as shown in FIG. 2 and FIG. 3. The pump pressure signal 358 is provided to a derivative calculation function 360. The derivative calculation function 360 can include any appropriate algorithm implementation that can numerically determine and quantify a rate of change of any parameter. In this embodiment, the derivative calculation function 360 provides a pressure derivative value 362 that is indicative of the rate of change of the pump pressure signal 358.

The pressure derivative value 362 is multiplied by the pump displacement signal 356 at a multiplier 364 to express the pressure derivative value 362 in terms of torque. In other words, multiplication of a value related to pressure at the outlet of the pump, with a value related to the displacement of the pump, provides a value that is related to the torque required to operate that pump at a displacement to provide a pressure. In this embodiment, the result of the multiplier 364 can be considered as a signal 366 that compensates for the rate of change of torque due to the pressure derivative.

The signal 366 is subtracted from a product of the error value 348 times Kp, a proportional gain, 368 at a summing junction 374. The output of the summing junction 374 represents a compensated error signal 376 that can be used for controlling the reference pressure. The compensated error signal 376 is divided by the product of the pump pressure 358 times Km, a margin gain, 370 at a divider 378 to provide a pressure correction signal 380. The pressure correction signal 380 is essentially an error value that is indicative of the change from the current outlet pressure of the pump that is required to achieve the desired reference pressure, and also accounts for effects of the spring acting on the pump control valve as well as any transient effects.

A margin pressure 382, denoted as P(margin), is subtracted from the pump pressure signal 358 at a summing junction 384 to provide a useful pressure value 386. In the illustrated embodiment, the margin pressure 382 is a constant value that is expressed in units of pressure and represents an approximation of the equivalent force in terms of pressure that is applied to the control valve 228 from the spring acting thereon.

The electronic controller 340 includes a summing junction 388 that yields the pressure command signal 342 based on the integral term multiplied by the integral gain 354, the pressure error signal 380, and the useful pressure value 386. In the illustrated embodiment these values are added to provide the pressure command signal 342 such that effects of time, system operating conditions, transient effects, and losses are accounted for.

Figure 5:
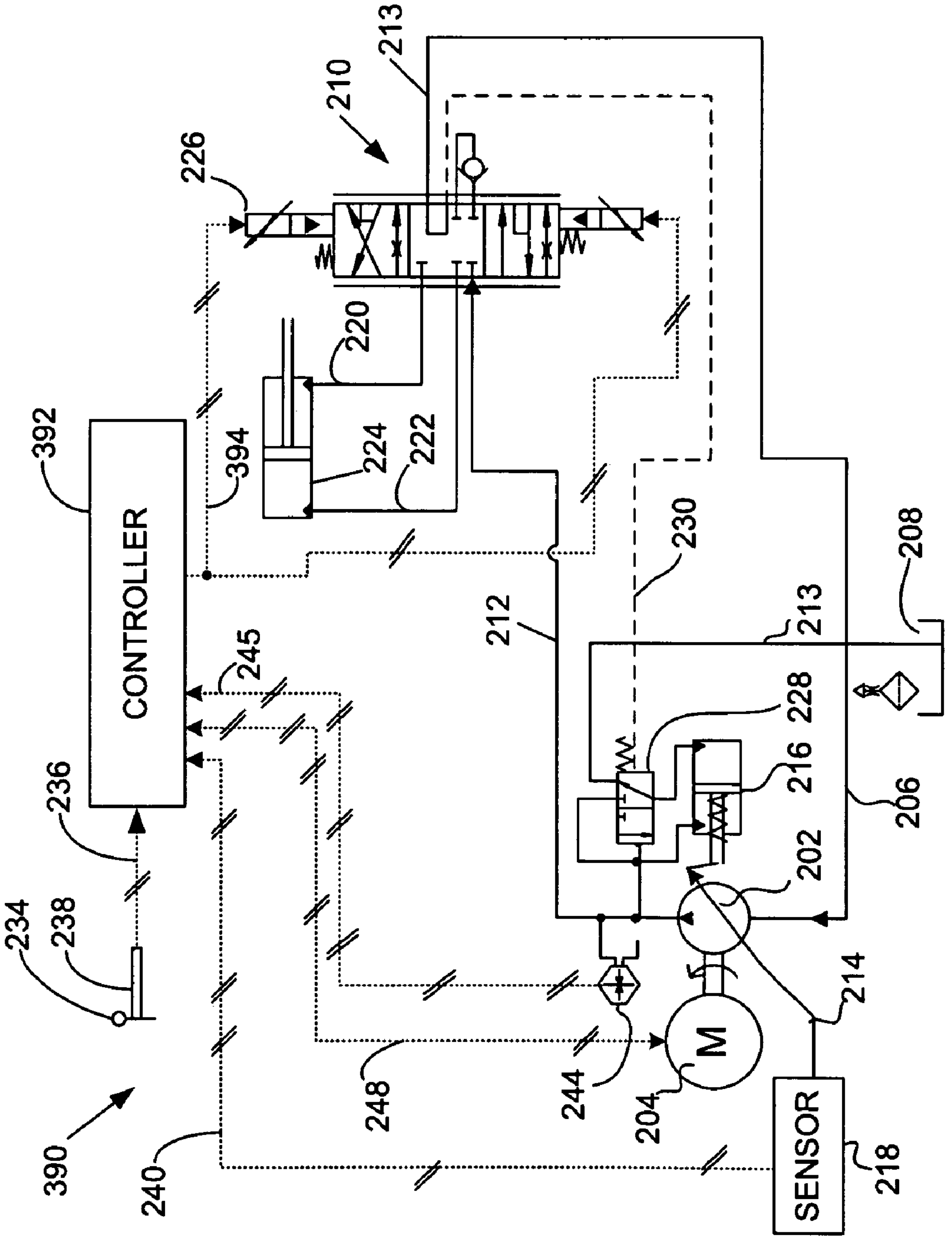
FIG. 5 is a block diagram of another alternate embodiment of a hydraulic system in accordance with the disclosure.

An alternate embodiment for a hydraulic system 390 is shown in FIG. 5. Elements, components, and/or systems included in the hydraulic system 390 that are the same or similar to corresponding elements, components, and systems described above are denoted by the same reference numerals as previously used for simplicity. The hydraulic system 390 includes many features that are similar to the two alternative embodiments for hydraulic systems illustrated in FIG. 2 and FIG. 3. In the embodiment illustrated in FIG. 5, the hydraulic system 390 does not include a valve that can be selectively actuated, such as the EH valve 227 (FIG. 2) or the EPRV 327 (FIG. 3) that can adjust the reference pressure 230. The hydraulic system 390 includes an electronic controller 392 that operates to appropriately limit the torque or load of the system by intercepting operator commands to the valve 210, and appropriately adjusting them to reduce the load of the system by decreasing the magnitude or otherwise limiting travel of the valve 210.

Figure 6:
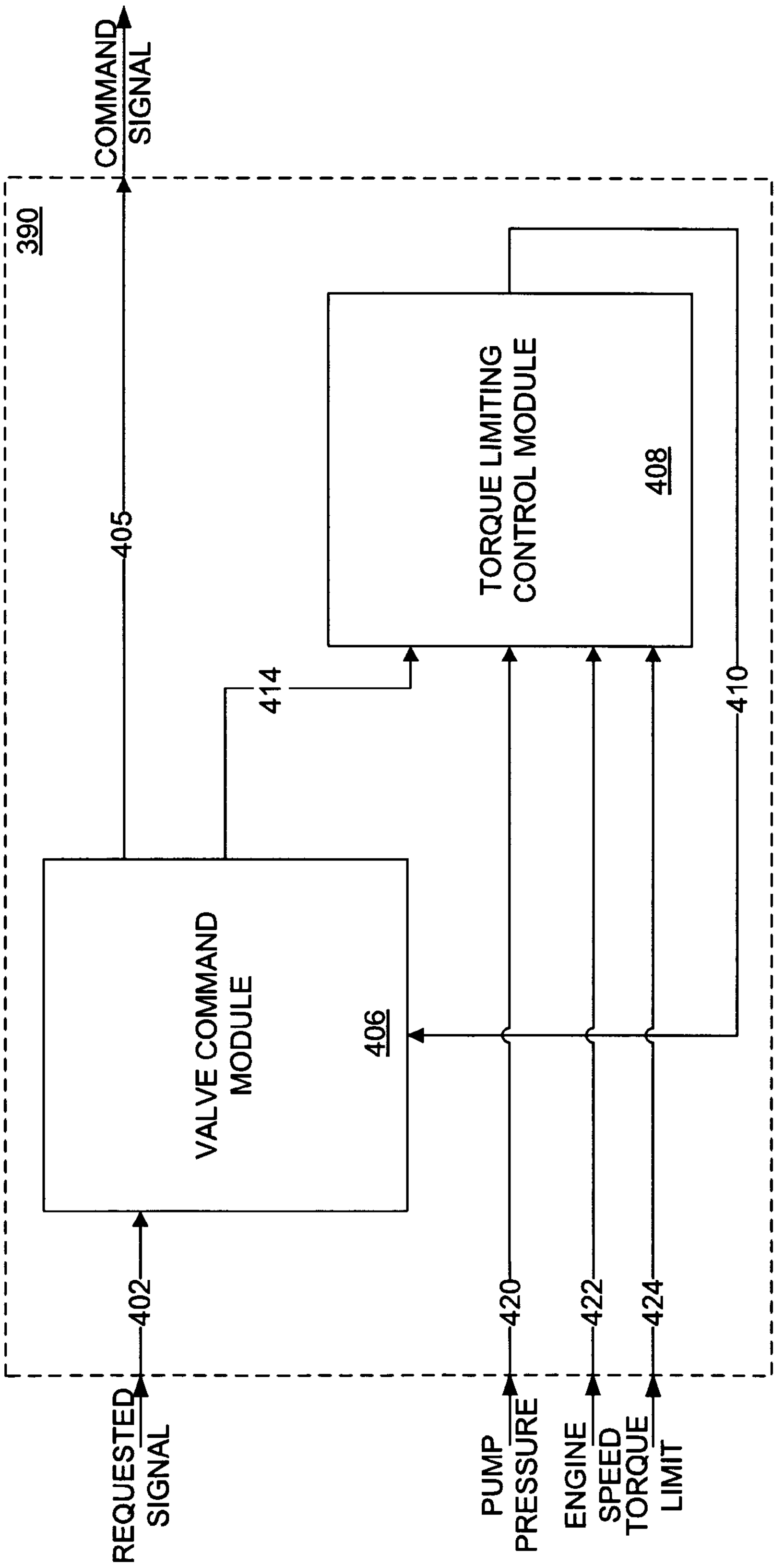
FIG. 6 is a block diagram illustration of an alternate embodiment of an electronic controller in accordance with the disclosure.

Accordingly, in one embodiment, the electronic controller 392 provides adjusted or corrected signals in a command line 394 that operably interconnects the electronic controller 392 with each of the two valve actuators 226 of the valve 210. The command line 394 provides a corrected valve flow signal, which represents the flow of fluid through the valve 210. As such flow is reduced, the load of the hydraulic system 390 is also reduced. The calculation of the desired valve flow depends on various parameters, for example, a current flow through the valve 210, the desired torque limit, the pressure at the outlet of the pump, the displacement of the pump, the speed of the pump, torque losses in the system, and potentially other parameters. A block diagram for at least a portion of the electronic controller 392 in accordance with the disclosure is shown in FIG. 6. The electronic controller 392 can be any electronic device that is capable of executing a computational algorithm or the like to manipulate signals provided to the electronic controller 392 by various sensors or other machine components, and that further provides command signals to various actuators and other components of the machine. The electronic controller 392 shown in this embodiment receives a requested signal 402 that is expressed, for example, in terms of a percentage (%) of implement actuation requested by an operator of the machine. Such operator command may be directed to the desired motion of an implement, for example, the lift or tilt of an implement actuator, or may alternatively be directed to a propel command for a motive system of the machine. Even though one exemplary embodiment is shown for control based on a single command control of the machine, other or additional command controls of the machine may operate in the same or similar fashion.

In the block diagram shown in FIG. 6, the electronic controller 390 receives the requested signal 402. The electronic controller 392 determines a valve command 405 at a valve command module 406 that is based, in part, on the requested signal 402. The valve command 405 can be a signal provided to valve 210 via the command line 394 (FIG. 5). In short, the valve command 405 represents the command parameter that effects a reduction in the flow of fluid passing through the valve 210 during operation of the actuator 224.

The valve command module 406 is interconnected with the torque limiting control module 408 to ensure that operation of the pump is consistent with the operation of the engine or other prime mover operating the pump, and to further ensure that the pump and prime mover are operating in harmony to achieve the desired system operation based on the operator's commands. The torque limiting control module 408 is arranged to determine a valve flow limit 410, which represents a maximum flow that can be allowed to flow through the valve 210 to be consistent with the torque limit.

The valve command module 406 receives the valve flow limit 410 from the torque limiting control module 408 and, along with the requested signal 402, determines the valve command 405. The valve command 405 may be a signal that causes a control valve to move and cause motion of an implement. One example of a control valve is shown as the 7-2 valve 210 (FIG. 5), which can move in response to an electrical signal provided to the valve actuator 226 via the command line 394. The valve command module 406 is further disposed to provide a valve flow estimate 414 to the torque limiting control module 408. One embodiment for a control algorithm that may be operating within the valve command module 406 is shown in the block diagram of FIG. 7.

Figure 7:
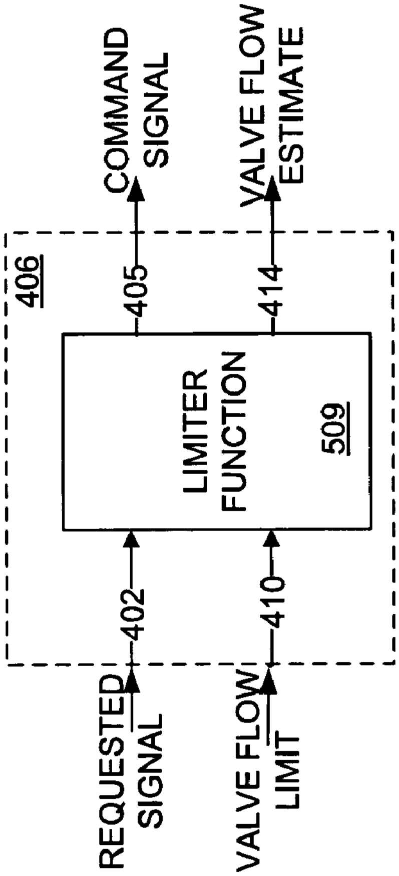
FIGS. 7, 8, and 9 are block diagram illustrations of various control algorithm implementations in accordance with the disclosure.

In FIG. 7, the requested signal 402 is provided to a limiter 509. The limiter 509 intercepts the requested signal 402 to ensure that an actual valve command signal 405 that is provided thereby is consistent with the limitations of the system and with the commanded operation of other command valves of the machine that are being operated simultaneously. The limiter 509 essentially adds one or more request signals that are produced in the same or similar fashion as the requested 402, aggregates all request signals, and compares the aggregate request signal to the valve flow limit 410. When the aggregate request signal exceeds the valve flow limit 410, the machine operating at that given condition is unable to provide an adequate flow of hydraulic fluid to operate all systems as requested by the operator.

Accordingly, the limiter 509 can reduce the requested signal 402 under such conditions by weighting the requested signal 402, and potentially all other similar request signals, to ensure that the total valve command signals do not exceed the valve flow limit 410. In one embodiment, the weighing may occur by a simple calculation that multiplies each request signal by a scaling factor. The scaling factor may be a ratio of the valve flow limit 410 over the aggregate request signal. In some embodiments, the limiter 509 may include additional functionality that accounts not only for the actual valve flow that is requested, but can also anticipate or predict the flow that will be requested. Such predictions may be based on modeling algorithms or may alternatively be based on calculations that determine the rate of change of various machine parameters, such as the requested signal 402. In such fashion, the valve command module 406 provides an estimation of the valve flow estimate 414 as an additional output. These outputs are provided to the torque limiting control module 408 (FIG. 6) to achieve an integrated interconnection between the two control modules.

Figure 8:
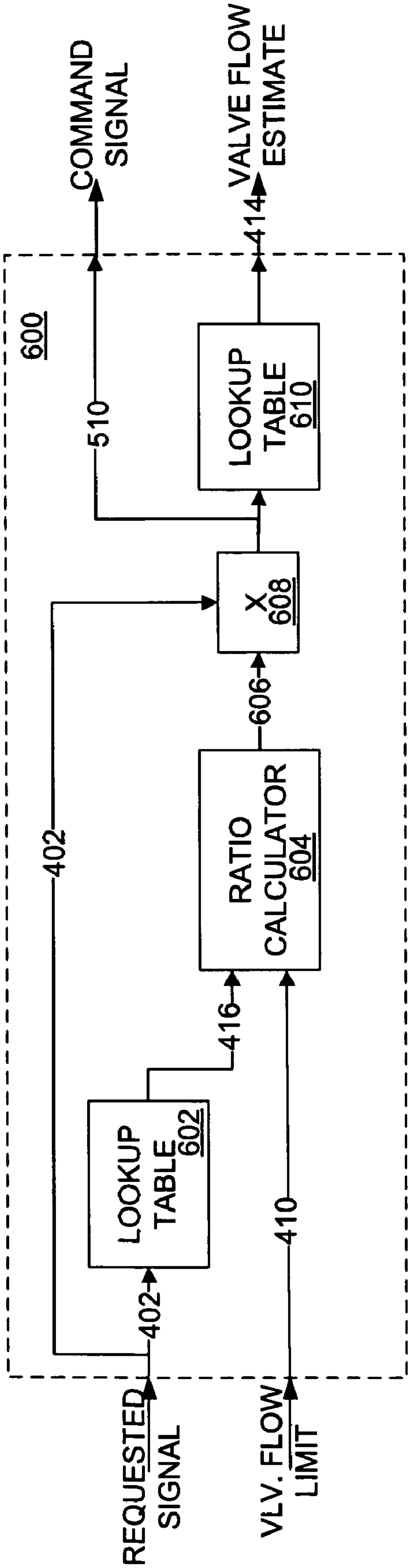

FIG. 8 is a block diagram for one embodiment of an implementation for the limiter 509. In this embodiment, the limiter 509 is a flow estimator function 600. The flow estimator function 600 receives the valve request signal 402. The request signal 402 is provided to a lookup table 602, which yields a requested valve flow 416. The lookup table 602 can be any function that calculates, interpolates, or otherwise correlates the command signal of a valve, and therefore the displacement of a valve member, to an equivalent flow area or flow capacity of the valve. As can be appreciated, such functionality can be accomplished by any known method, for example, by a lookup table.

The requested valve flow 416, along with the valve flow limit 410, are provided to a ratio or scale factor calculator function 604. This function can calculate a ratio or other weighted scale factor 606. When the requested valve flow 416 is below the valve flow limit 410, the scale factor 606 is equal to one. When, however, the requested valve flow 416 exceeds the valve flow limit 410, the scale factor 606 becomes less than one. In general, the scale factor may be indicative of the extent by which the requested valve flow may be scaled down such that it remains below the valve flow limit 410.

In one embodiment, the requested signal 402 is multiplied by the scale factor 606 at a multiplier 608 to yield the scaled or actual valve command signal 510 as an output of the flow estimator function 600, which in one embodiment is the limiter 509 (FIG. 7). The actual valve command signal 510 is provided to an additional lookup function or table 610, which correlates the actual valve command signal 510 to values of the valve flow estimate 414 (also shown in FIG. 6).

Figure 9:
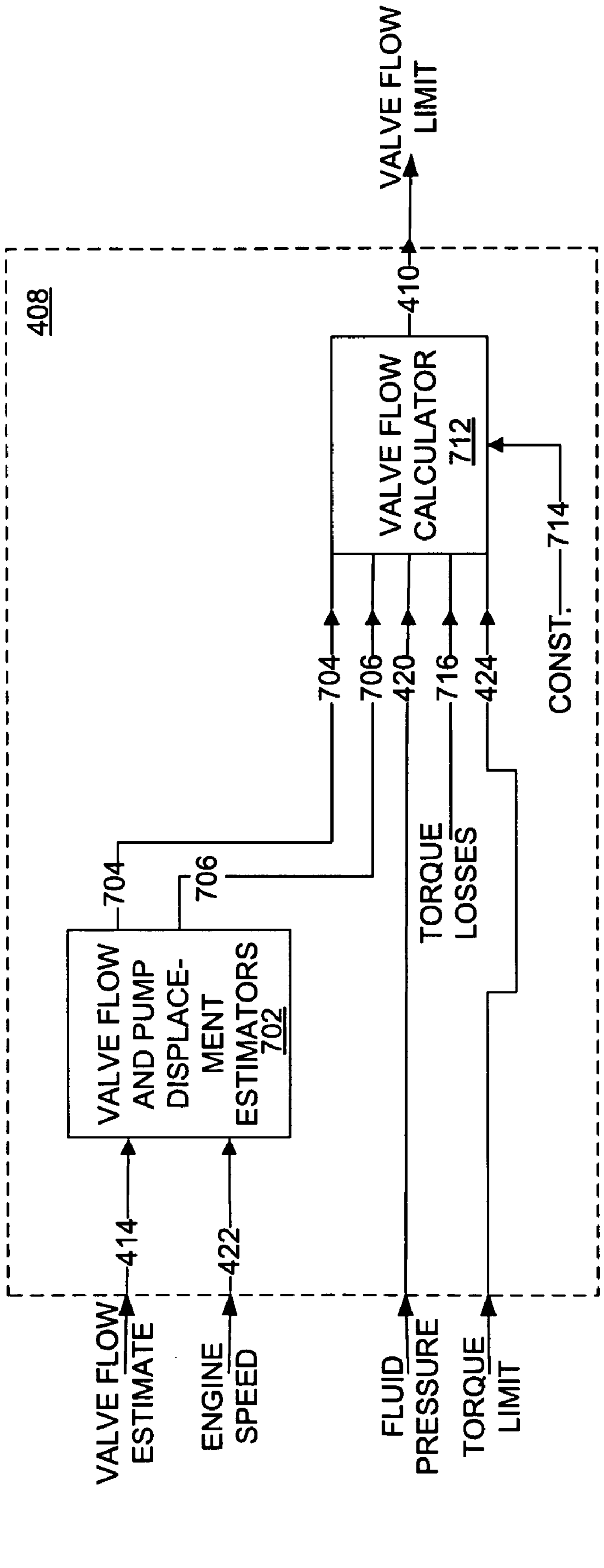

A block diagram of one embodiment of an algorithm implementation for the torque limiting control module 408 is shown in FIG. 9. As can be seen in FIG. 6, the torque limiting control module 408 receives various inputs. The valve flow estimate 414 is provided by the valve command module 406, along with the engine speed 422, are provided to valve flow and pump displacement estimators, which are collectively denoted by reference numeral 702. The estimators 702 include appropriate control algorithms that can calculate and/or interpolate based on tabulated data the pump displacement and corresponding valve flows that can achieve the valve flow estimate 414, based on system operating parameters. In this embodiment, the system operating parameter used in such determination is the engine speed 422. In an alternate embodiment, the estimators 702 may include additional functionality that accounts for transient effects during operation of the pump and/or the engine.

The estimators 702 provide a limited valve flow 704 as a first output and an estimated pump displacement 706 as a second output. One can appreciate that the estimated pump displacement 706 may not be required when a pump displacement sensor, for example, the displacement sensor 218 (FIG. 5), is used.

The torque limiting control module 408 is further disposed to determine the valve flow limit 410 in a valve flow calculator function 712. The valve flow calculator function 712 receives various different inputs in performing the calculation of the valve flow limit 410, which include the limited valve flow 704, the fluid pressure 420, the torque limit 424, and others. In addition to these parameters, the valve flow calculator function 712 further receives a constant 714, to be used in unit conversions, and a torque loss 716, which represents known losses of power in the system due to friction or leakage. Based on these and potentially other parameters, the valve flow calculator can determine the valve flow limit 410 that is appropriate to achieve the balance between system load and power input to the system from the engine.

In one embodiment, a commanded flow of the valve 210, $Q_{v,cmd}$, to be reduced from the outlet of the pump 202 is calculated according to the following equation or control law:

$$Q_{v,cmd} = Q_v + K_p(T_{lim} - D_p P_p - T_{loss})\left(\frac{\omega_p}{\alpha_v P_p}\right)$$

where $Q_v$ is an actual flow of the valve. Such flow is modified by a delta or difference that includes a proportional gain Kp, multiplied by a torque error that is based on $T_{lim}$, a torque limit, $D_p$, a pump displacement, and $P_p$, the pressure at the outlet of the pump. Additional terms include $\omega_p$, the speed of the pump, and $\alpha_v$, which is a dynamic constant of the valve. This last term including the speed of the pump is optional and represents a gain scheduling term that depends on the rate of response of the valve to changing commands.

INDUSTRIAL APPLICABILITY

The present disclosure is applicable to hydraulic systems that utilize variable displacement pumps. By way of example, the disclosure may be used in machines having hydraulic systems associated therewith that are operated by variable displacement pumps. A displacement setting of such variable displacement pumps may be adjusted depending on the desired mode of operation of the machine. For example, the torque output of the hydraulic system of the machine may be limited, as desired, by de-rating the pump's output based on an actual or estimated torque loading on the system. Such de-rating may be accomplished by use of an electro-hydraulic system in accordance with the present disclosure or by electronically limiting commands provided to valves associated with the system that are connected to implements or other power consuming devices.

The embodiments for electro-hydraulic systems disclosed herein are further capable of adaptation to a variety of different components, such as different pumps, that can be integrated into existing systems. Hence, in instances where different applications require different torque limits, many components of the machine may be maintained common while the different torque limits of each of the components that are different among the applications may be arranged to operate in accordance with the present disclosure.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A machine including an engine and a hydraulic system having a reservoir connected to a drain passage, the hydraulic system including an implement valve disposed to operate an implement, the implement valve providing fluid at a load sensing pressure within a control conduit during operation, the machine comprising:

a manual control device adapted to provide a request signal;

a variable displacement pump operably connected to the engine, disposed to receive a torque limit from the engine, and associated with the hydraulic system, the variable displacement pump providing an operating fluid flow at a supply pressure to the hydraulic system, the operating fluid flow being correlated to a load during operation;

a control valve fluidly connected to the control conduit and operating to adjust a displacement setting of the variable displacement pump based on a pressure difference between a reference pressure and the supply pressure;

an electro-hydraulic relief valve in fluid communication with the control conduit and the drain passage, the electro-hydraulic relief valve disposed to selectively vent fluid from the control conduit into the drain passage in response to a command signal;

an electronic controller associated with the implement valve, the electro-hydraulic relief valve and the engine, and disposed to receive at least one signal that is indicative of at least one machine operating parameter, the electronic controller being further disposed to calculate the reference pressure and provide the command signal to the electro-hydraulic relief valve based on the reference pressure;

wherein the electronic controller is further disposed to receive a pressure signal that is indicative of a pressure of fluid at an outlet of the variable displacement pump, wherein the reference pressure is at least partially based on a derivative of the pressure signal.

2. A machine including an engine and a hydraulic system having a reservoir connected to a drain passage, the hydraulic system including an implement valve disposed to operate an implement, the implement valve providing fluid at a load sensing pressure within a control conduit during operation, the machine comprising:

a manual control device adapted to provide a request signal;

a variable displacement pump operably connected to the engine, disposed to receive a torque limit from the engine, and associated with the hydraulic system, the variable displacement pump providing an operating fluid flow at a supply pressure to the hydraulic system, the operating fluid flow being correlated to a load during operation;

a control valve fluidly connected to the control conduit and operating to adjust a displacement setting of the variable displacement pump based on a pressure difference between a reference pressure and the supply pressure;

an electro-hydraulic relief valve in fluid communication with the control conduit and the drain passage, the electro-hydraulic relief valve disposed to selectively vent fluid from the control conduit into the drain passage in response to a command signal;

an electronic controller associated with the implement valve, the electro-hydraulic relief valve and the engine, and disposed to receive at least one signal that is indicative of at least one machine operating parameter, the electronic controller being further disposed to calculate the reference pressure and provide the command signal to the electro-hydraulic relief valve based on the reference pressure;

wherein the electronic controller is further disposed to receive an estimated torque signal and a torque limit, to calculate an error value between the estimated torque signal and the torque limit, and to integrate the error value to provide an integral term that represents a portion of the command pressure.

3. The machine of claim 2, wherein the electronic controller is further disposed to multiply the error value by a proportional gain, and wherein the command signal is based on a product of the error value and the proportional gain.

4. The machine of claim 2, wherein the electronic controller is disposed to provide a compensated error signal that is based on the error value and adjusted based on a rate of change of a pressure at the outlet of the variable displacement pump.

5. A machine including an engine and a hydraulic system having a reservoir connected to a drain passage, the hydraulic system including an implement valve disposed to operate an implement, the implement valve providing fluid at a load sensing pressure within a control conduit during operation, the machine comprising:

a manual control device adapted to provide a requested signal;

a variable displacement pump operably connected to the engine, disposed to receive a torque limit from the engine, and associated with the hydraulic system, the variable displacement pump providing an operating fluid flow at a supply pressure to the hydraulic system via a supply conduit, the operating fluid flow being correlated to a load during operation;

a control valve fluidly connected to the control conduit and operating to adjust a displacement setting of the variable displacement pump based on a pressure difference between a reference pressure and the supply pressure;

an electronic pressure reducing valve (EPRV) in fluid communication with the control conduit and the supply conduit the EPRV disposed to selectively vent fluid from the supply conduit into a reduced pressure conduit in response to a command signal;

a low pressure resolver having a first inlet in fluid communication with the reduced pressure conduit, a second inlet in fluid communication with the control conduit, and an outlet in fluid communication with the control valve, the low pressure resolver disposed to fluidly connect the outlet with one of the first inlet and the second inlet that is disposed at a lowest pressure therebetween;

an electronic controller associated with the implement valve, the EPRV and the engine, and disposed to receive at least one signal that is indicative of at least one machine operating parameter, the electronic controller being further disposed to calculate the reference pressure and provide the command signal to the EPRV based on the reference pressure.

6. The machine of claim 5, wherein the EPRV includes an electrical actuator that operates in response to the command signal to change a flow characteristic of the EPRV.

7. The machine of claim 5, wherein the electronic controller is further disposed to receive a pressure signal that is indicative of a pressure of fluid at an outlet of the variable displacement pump, wherein the reference pressure is at least partially based on a derivative of the pressure signal.

8. The machine of claim 5, wherein the electronic controller is further disposed to receive an estimated torque signal and a torque limit, to calculate an error value between the estimated torque signal and the torque limit, and to integrate the error value to provide an integral term that represents a portion of the command pressure.

9. The machine of claim 8, wherein the electronic controller is further disposed to multiply the error value by a proportional gain, and wherein the command signal is based on a product of the error value and the proportional gain.

10. The machine of claim 8, wherein the electronic controller is disposed to provide a compensated error signal that is based on the error value and adjusted based on a rate of change of a pressure at the outlet of the variable displacement pump.

11. A method for de-rating a hydraulic system operating in a machine by limiting a flow of fluid through a main valve, the method comprising:

determining a loading of the hydraulic system;

providing a scale factor for de-rating the hydraulic system based on the loading;

applying the scale factor to a requested signal to generate a commanded signal; and reducing a load consumption of the hydraulic system by operating the main valve in response to the commanded signal;

wherein providing the scale factor further includes determining an error signal based on the loading and a torque limit.

12. The method of claim 11, wherein determining the loading of the hydraulic system includes:

providing a pressure signal that is indicative of a pressure of fluid at the outlet of a variable displacement pump;

providing a displacement signal that is indicative of a displacement setting of the variable displacement pump; and calculating an estimated torque by, at least in part, multiplying the pressure signal and the displacement signal.

13. The method of claim 12, wherein providing the displacement signal is accomplished by at least one of measuring a displacement state of the variable displacement pump and estimating the displacement state based on a flow value and a speed of an engine disposed to operate the variable displacement pump.

14. The method of claim 13, wherein providing the scale factor includes providing a ratio between a requested flow and a valve flow limit, the requested flow being based on a request from an operator, and the valve flow limit being based on a pressure at the outlet and the displacement setting of the variable displacement pump.

15. The method of claim 14, wherein the displacement of the variable displacement pump is estimated.

16. The method of claim 11, wherein applying the scale factor to the requested signal includes:

providing the requested signal to a modulation function that yields a valve request quantity based on the requested signal; and supplying the valve request quantity to a valve controller function to yield a valve command signal.

17. The method of claim 16, further including:

providing the valve requested signal to a limiter function;

wherein the limiter function determines the scale factor in a ratio calculator based on the valve request signal, and wherein the limiter function multiplies the valve requested signal by the scale factor to yield the commanded signal.

* * * * *